United States Patent Office 3,427,912
Patented Feb. 18, 1969

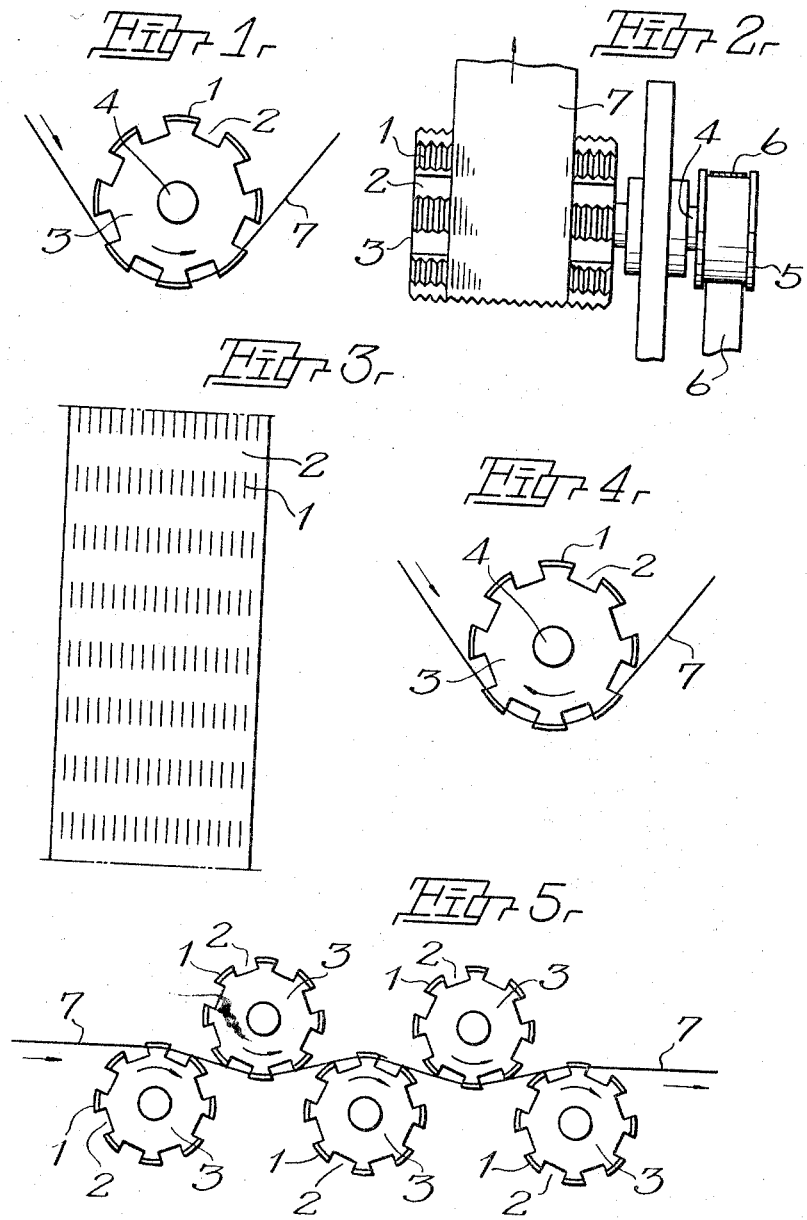

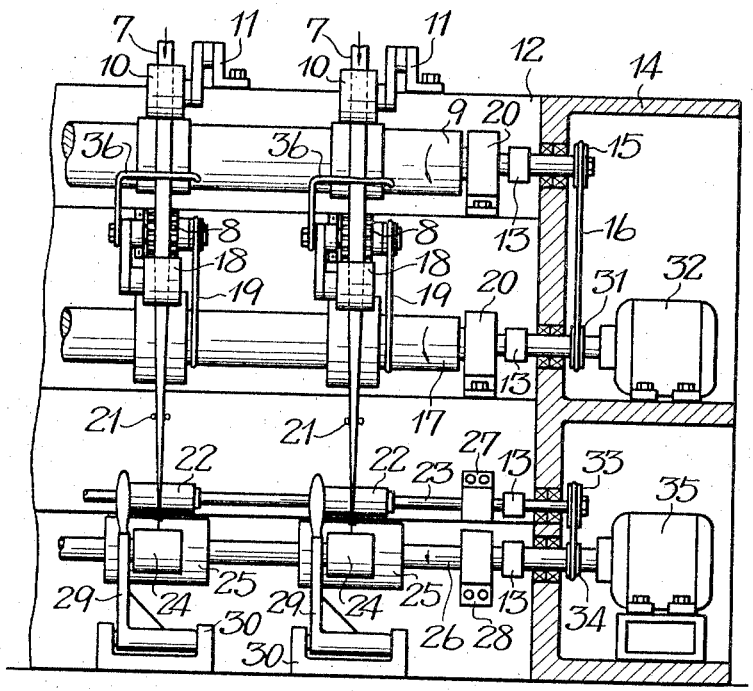
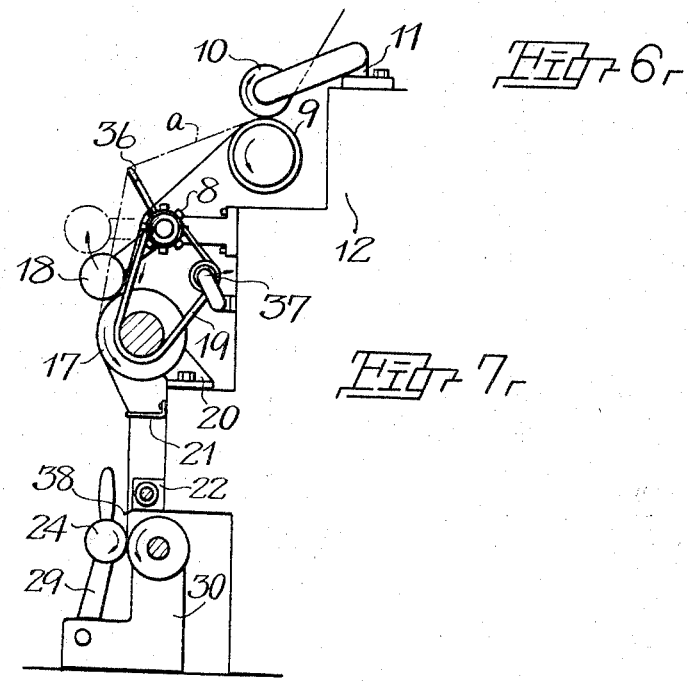

3,427,912
PROCESS FOR PREPARATION FOR SPLITTING FIBER AND ITS APPARATUS FOR THE SAME
Masayuki Nozawa, Toshinori Ito, and Shingo Hayashi, Numazu-shi, and Naotoshi Otsuka, Mishima-shi, Japan, assignors to Toshiba Machine Co., Ltd., Chuo-ku, Tokyo, Japan, a corporation of Japan
Filed July 27, 1965, Ser. No. 475,128
Claims priority, application Japan, Aug. 13, 1964, 39/46,606
U.S. Cl. 83—20    10 Claims
Int. Cl. B26d 7/14; B26f 1/20

The present invention relates to a process in which thermoplastic films are slit in numerous places by a cutter structure at the periphery of a roller and thereby fibers in fine and homogeneous network form are produced as desired optionally, and the present invention also relates to an apparatus that is employed for implementation of the present invention.

In accordance with the known processes, slitting fiber is effected by the draw direction of film, the extent of draw and the materials used, and consequently, the slitting capability is limited to a definite range. In other words, when the plastic film is elongated in some degree, a crack is liable to form in the film, so that when a torsion force, a compressed air force and an impact force are applied to the aforesaid film, the cracks are enlarged. The means to obtain fiber form film as aforementioned is publicly known. In order that the aforesaid film may run at the high velocity and the film may be cut into fine fiber pieces, according to known processes, the aforesaid forces are increased in proportion to the running velocity of the film and simultaneously repetitious forces at high frequency are added proportionally.

Apparatus having many parts are required for the aforesaid processes for slitting fibers, and it is a drawback of the aforesaid process that the apparatus is built up of complicated parts.

Moreover, the quality of slit fibers is affected by the thickness of the film and its degree of molecular orientation with respect to the direction of draw. The capability of slitting fibers is limited to a constant denier range.

In accordance with the present invention, the aforementioned defects are removed, the film can be cut in homogeneous form and fibers in a homogeneous and network structure can be produced as desired.

It is a principal object of the present invention to provide a new and improved process for manufacturing slit film yarn characterized in that a plurality of cutter edges and recesses between the aforesaid edges are situated at the external periphery of roller and the thermoplastic film is placed in contact with and guided around the aforesaid roller so that the plastic film is slit, by adjusting variably and appropriately a rotation velocity of aforesaid roller, a running speed of aforesaid plastic film and the angle of contact of the said film around the roller.

It is another object of the invention to provide an improved apparatus for producing fibers of slit film characterized in that a plurality of cutter edges and recesses between the aforesaid edges are situated at the external periphery of the aforesaid roller and, as the aforesaid roller is driven by a motor, the plastic film is simultaneously made to run in contact with the cutting edges of roller and thereby the yarns of slit film are produced. In other words, with the present invention axially extending recesses are distributed about the circular roller periphery, cutting edges are arranged between the recesses, and the positions of those cutting edges are gradually offset in the axial direction so that the film is cut into the fibers of fine network structure by the aforesaid cutting edges of cutter.

Therefore, the film on the cutter is cut effectively by the cutter edges and the operation is affected by the angle of contact of the film around the cutter and the number of recesses. In other words, if the cutting edges are distributed on the entire circular periphery of cutter without any recesses, the force of the edge cutting into film will be dissipated and weakened and the operation of manufacturing fibers of slit film will be ineffective.

Numerous other objects and advantages of the invention will be apparent from the following description, which, taken in connection with the accompanying drawings, discloses a preferred embodiment thereof.

Referring to the drawings which indicate one example for the apparatus of the present invention:

FIG. 1 shows a front view of the apparatus, and FIG. 2 is a side view thereof.

FIG. 3 is a developed diagram along the external periphery of a roller in FIG. 2.

FIGS. 4 and 5 show applied examples of FIGS. 1 and 2.

FIG. 6 indicates an example of a winder equipped with the apparatus of the present invention.

FIG. 7 is a sectional diagram viewed at the middle line of FIG. 6.

Referring to FIGS. 1–5 in more detail, wherein a tap form cutter is employed as a roller:

This embodiment consists of a tap form cutter in numerous sections 1 separated by a plurality of recesses 2 between the aforesaid cutter sections 1 which are distributed over the external periphery of roller 3. The aforesaid roller 3 is mounted on a rotary shaft 4 and the aforesaid roller 3 is made to revolve by the means of pulley 5 and belt 6. The workpiece 7 in the drawings is a thermoplastic film arranged in contact with the aforesaid cutter sections 1 of the roller 3.

The correlation of roller 3 and film 7 is as follows:

FIG. 3 is a developed view of the external periphery of roller 3. When the rotation velocity of roller 3 is equal to the running speed of film 7, the part of film 7 in contact with the cutter sections 1 will be slit according to the pattern shown in the drawing (FIG. 3), since the external periphery of roller 3 is developed and repeated in the film 7. In this way a slit yarn in network structure will be produced.

When the rotation velocity of roller 3 is greater than the running velocity of film 7, the pattern of network structure will be differently determined by sections 1 and recesses 2 between the aforesaid cutter sections 1.

Assuming the number of rows of cutter sections 1 is A, the pitch of the screw thread is P and lead of screw thread is 1, the pitch of network structure to be cut is $P/A$.

Consequently, when the pitch P is smaller than A or, when the number A is taken as larger than P extremely fine fibers can be produced.

When the screw thread of the roller which forms the cutter is devised in a structure similar to a double threaded screw or triple threaded screw, increasing the number of recesses, the number of revolutions of roller 3 may be diminished to produce results similar to those of a single threaded screw.

It is not necessary that the recesses 2 be in a straight line form, since spiral recesses may be formed in the cutter. Consequently, when spiral recesses are formed, the slit network pattern will not be so simple.

When a lap or contact angle of film 7 wound around the roller 3 is chosen as a large angle and a large difference is made between the running speed of film 7 and the velocity of cutter sections 1, fibers in long lengths will be cut, namely fibers in large networks will be produced.

When the film to be slit is tough, it is disposed in a device as indicated in FIG. 4 with the running direction of film 7 is opposed to the rotation direction of roller 3 so that the film may be conveniently slit. When the film is easily split, fluffy fibers will be produced according to the aforesaid device with the rotation direction of roller 3 opposes to the running direction of film 7 and the fluffy fibers may be entangled in the cutter sections 1 and may be tangled in the roller 3.

So when the aforesaid film is easily slit, it is disposed in the device with the rotation direction of roller 3 directed in the running direction of film 7.

When a plurality of rollers 3 are assembled and arranged as indicated in FIG. 5 and the velocity of rollers 3 is chosen in excess of to the running velocity of film 7, the film 7 will pass around a plurality of rollers 3 and fine fibers will be produced, if desired.

This process is particularly suitable for slitting the film 7 to produce fluffy fibers.

An example where a screw type cutter is employed as the roller was described in the preceding paragraph. It does without saying that the similar effect may be rendered in a device where a plurality of circular and thin cutters are overlapped and assembled perpendicularly to the axis of roller 3 and the recesses are at the external periphery of cutters.

Furthermore, referring to FIGS. 6 and 7 in more detail, in which an example of a winder equipped with an apparatus of present invention is indicated, and according to this example, a further understanding can be obtained for the present invention:

The film 7 before slitting, passes along feed roll 9, dotted line a, guide bar 36, feed roll 17 and guide 21 and is taken up on bobbin 24. Next, as the film 7 is simultaneously placed in contact with the dual nip rolls 10 and 18 and couple of feed rolls 9 and 17, the film 7 is slipped from the guide bar 37 and the film 7 contacts the slitting cutter 8 and is slit thereby. Motor power is transmitted to the feed roll 9 from the motor 32 located inside a box 14, the drive being transmitted through the medium of a pulley 31, a belt 16 and pulley 15.

A coupling 13 transmits the drive to roll 9 and a bracket 20 supports feed roll 19. Motor power is similarly transmitted the feed roll 17 from the motor 32. In this case, the tension of film 7 acting on the fiber slitting cutter 8 is regulated by diameter ratio of pulley 34 in proportion to pulley 15, the respective diameters of the feed rolls and the circular velocity of feed roll determined appropriately.

The fiber slitting cutter 8 is rotated by means of a belt 19 and feed roll 17. A tension pulley 37 acts on belt 19.

The slit film 7 is conveyed by the traverse apparatus 22 and is traversed by the traverse guide 38 in a definite length and is taken up on the bobbin 24. Bobbin 24 is driven by the drum 25 and is fitted on the swing arm 29. The swing arm 29 is assembled on a bracket 30.

The drum 25 is fixed on the shaft 26, supported by bracket 28, and motor power is transmitted the shaft 26 from the motor 35 through the medium of coupling 13 and pulley 33. In a similar way as aforementioned, an ordinary groove cam, namely a revolving piece, is fitted inside the traverse apparatus and the aforesaid cam is fixed on the shaft 23, suported by bracket 27, and motor power is transmitted to the aforesaid cam from the motor 35 through the medium of coupling 13 and pulleys 33 and 34.

The traverse guide 38 is traversed by the aforesaid groove cam and thereby the film 7 can be split continuously.

The external peripheral velocity of fiber slitting cutter 8 can be changed optionally in accordance with the angle of contact between film 7 and cutter 8 as well as the velocity of film 7, whereby the length of slit in the film 7 can be determined optionally. Simultaneously when the number of recesses for the aforesaid cutters 8, the pitch of cutting edge rows and the length of equal pitch are strictly designed and manufactured, the interval between slits and the fineness of the slits can be provided homogeneously and exactly for the slit yarns.

With the present invention extremely fine fibers can be produced, the slit network as optionally desired can be obtained easily, the film can be cut in and split securely without being affected by the material quality of film, and the velocity of running film can be set at an extremely high speed; and thus, with the machine in accordance with the present invention high production can be suitably maintained, operation at high efficiency can be conducted thereby and the machine can be constructed according to a simple design and at a cheap cost.

It is thought that the invention and many of its attendant advantages will be understood from the foregoing description, and it will be apparent that various changes may be made in the form, construction, and arrangement of parts of the invention without departing from the spirit and scope of the invention, the apparatus disclosed being merely a preferred embodiment thereof.

We claim:

1. In a process for manufacturing yarns from slit film, the step of guiding film around and in contact with a portion of the peripheral surface of a roller having cutting edges thereon which extend through and slit the film substantially in the direction of travel of said film during guiding of the latter around said roller.

2. In a process as recited in claim 1, driving said roller at a peripheral speed equal to the speed of movement of the film so that the pattern of cutting edges of said roller is developed and repeated in the film.

3. In a process as recited in claim 1, rotating said roller in a direction where the cutting edges at its periphery move in the same direction as the film.

4. In a process as recited in claim 1, rotating said roller in a direction which opposes the direction of movement of the film.

5. For use in an apparatus for forming slits in a film strip to be used in the manufacture of yarn, a roller formed with a plurality of recesses in its exterior periphery, said recesses being elongated and being distributed about the axis of said roller and extending along said axis, and said roller having between each pair of successive recesses a row of cutting edges extending therebetween and situated one directly next to the other.

6. A roller as recited in claim 5 and wherein said recesses are parallel to the axis of the roller and said cutting edges extend circumferentially about the roller axis.

7. The roller of claim 5 and wherein said recesses are in the form of axially extending grooves each of which extends from one end to an opposite end of said roller.

8. The roller of claim 5 and wherein the cutting edges of one row are axially offset with respect to the cutting edges of an adjoining row.

9. The combination of claim 5 and wherein said cutting edges of said rows form parts of screw threads.

10. In a process as recited in claim 1, driving said roller at a peripheral speed greater than the peripheral speed of the film so that the length of the slits is greater than the longitudinal length of the cutting edges.

References Cited

UNITED STATES PATENTS

| 1,740,604 | 12/1929 | Kienzl | 10—101 |
| 3,162,076 | 12/1964 | Emerson et al. | 83—678 X |

FOREIGN PATENTS

| 1,002,609 | 2/1957 | Germany. |

ANDREW R. JUHASZ, *Primary Examiner.*

U.S. Cl. X.R.

83—332, 678